United States Patent
Gao et al.

(10) Patent No.: US 9,806,557 B2
(45) Date of Patent: Oct. 31, 2017

(54) WIRELESS CHARGING SYSTEM WITH ADAPTIVE RADIO FREQUENCY INTERFERENCE

(71) Applicant: Intel Corporation, Santa Clara, CA (US)

(72) Inventors: Jie Gao, Sunnyvale, CA (US); Songnan Yang, San Jose, CA (US); Xintian Lin, Mountain View, CA (US); Ulun Karacaoglu, San Diego, CA (US); Bin Xiao, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 216 days.

(21) Appl. No.: 14/865,343

(22) Filed: Sep. 25, 2015

(65) Prior Publication Data
US 2017/0093197 A1   Mar. 30, 2017

(51) Int. Cl.
*H04W 4/00* (2009.01)
*H02J 7/02* (2016.01)
*H04W 52/24* (2009.01)
*H02J 7/04* (2006.01)

(52) U.S. Cl.
CPC .............. *H02J 7/025* (2013.01); *H02J 7/042* (2013.01); *H04W 4/008* (2013.01); *H04W 52/241* (2013.01)

(58) Field of Classification Search
CPC ......... H02J 7/025; H02J 7/042; H04W 4/008; H04W 52/241
See application file for complete search history.

(56) References Cited

U.S. PATENT DOCUMENTS

| | | | | |
|---|---|---|---|---|
| 2010/0114241 A1* | 5/2010 | Donofrio | ............... | A61N 1/37 607/59 |
| 2011/0187318 A1* | 8/2011 | Hui | ....................... | H02J 17/00 320/108 |
| 2011/0199045 A1* | 8/2011 | Hui | ..................... | H02M 3/3376 320/108 |
| 2014/0375258 A1* | 12/2014 | Arkhipenkov | .......... | H02J 7/025 320/108 |
| 2015/0326062 A1* | 11/2015 | Gonzalez Valdez | .... | H02J 17/00 320/108 |
| 2015/0362360 A1* | 12/2015 | Kovacs | .................. | G01G 19/44 177/245 |
| 2017/0077744 A1* | 3/2017 | Kim | ........................ | H02J 7/042 |

OTHER PUBLICATIONS

Xiao Lu et al., Wireless Charger Networking for Mobile Devices: Fundamentals, Standards, and Applications, arXiv:1410.8635v2 [cs.NI], Dec. 9, 2014, 16 pages.

* cited by examiner

*Primary Examiner* — David Bilodeau
(74) *Attorney, Agent, or Firm* — Alpine Technology Law Group LLC

(57) ABSTRACT

The disclosure generally relates to a method and apparatus for wireless charging station with adaptive radio interference detection and control. During wireless charging of a smart device, the harmonics associated with the magnetic resonance coupling between the power transmission unit (PTU) and the power receiving unit (PRU) may interfere with radio communication if PRU engages in radio messaging. The disclosed embodiments provide method and system for identifying interference and adapting the wireless charging power to reduce or eliminate interference while efficiently charging the PRU.

32 Claims, 6 Drawing Sheets

WIRELESS CHARGING SYSTEM WITH ADAPTIVE RADIO FREQUENCY INTERFERENCE

BACKGROUND

Field

The disclosure relates to a method, apparatus and system of wireless charging stations with adaptive radio frequency to avoid or substantially eliminate interference.

Description of Related Art

Wireless charging or inductive charging uses a magnetic field to transfer energy between two devices. Wireless charging can be implemented at a charging station. Energy is sent from one device to another device through an inductive coupling. The inductive coupling is used to charge batteries or run the receiving device. The Alliance for Wireless Power (A4WP) was formed to create industry standard to deliver power through non-radiative, near field, magnetic resonance from the Power Transmitting Unit (PTU) to a Power Receiving Unit (PRU).

The A4WP defines five categories of PRU parameterized by the maximum power delivered out of the PRU resonator. Category 1 is directed to lower power applications (e.g., Bluetooth headsets). Category 2 is directed to devices with power output of about 3.5 W and Category 3 devices have an output of about 6.5 W. Categories 4 and 5 are directed to higher-power applications (e.g., tablets, netbooks and laptops).

PTUs of A4WP use an induction coil to generate a magnetic field from within a charging base station. A second induction coil in the PRU (i.e., portable device) takes power from the magnetic field and converts the power back into electrical current to charge the battery. In this manner, the two proximal induction coils form an electrical transformer. Greater distances between sender and receiver coils can be achieved when the inductive charging system uses magnetic resonance coupling. Magnetic resonance coupling is the near field wireless transmission of electrical energy between two coils that are tuned to resonate at the same frequency.

Wireless charging is particularly important for fast wireless charging of devices including smartphones, tablets and laptops. The magnetic resonance coupling may cause Radio Frequency Interference (RFI) when the device under charge uses its radio for data transfer. Accordingly, there is an need for method and system for wireless charging system with adaptive RFI for effective wireless charging.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Figure 1:
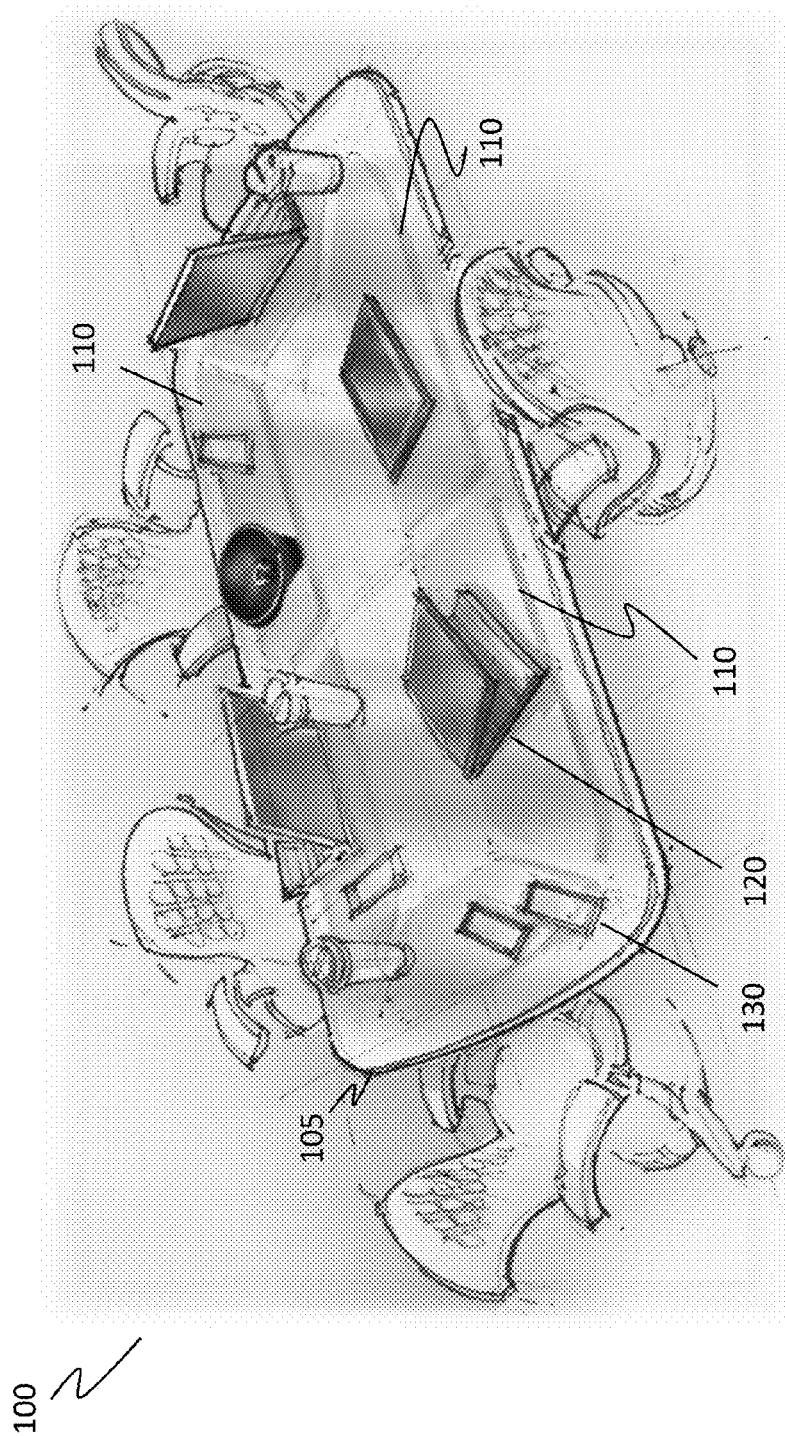
FIG. 1 is a schematic overview of wireless charging infrastructure according to one embodiment of the disclosure.

Certain embodiments may be used in conjunction with various devices and systems, for example, a mobile phone, a smartphone, a laptop computer, a sensor device, a Bluetooth (BT) device, an Ultrabook™, a notebook computer, a tablet computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Institute of Electrical and Electronics Engineers (IEEE) standards (IEEE 802.11-2012, IEEE Standard for Information technology-Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12—TGac Channel Model Addendum Document"); IEEE 802.11 task group ad (TGad) (IEEE 802.11ad-2012, IEEE Standard for Information Technology and brought to market under the WiGig brand—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Wireless HD™ specifications and/or future versions and/or derivatives thereof, units and/or devices which are part of the above networks, and the like.

Some embodiments may be implemented in conjunction with the BT and/or Bluetooth low energy (BLE) standard. As briefly discussed, BT and BLE are wireless technology standard for exchanging data over short distances using short-wavelength UHF radio waves in the industrial, scientific and medical (ISM) radio bands (i.e., bands from 2400-2483.5 MHz). BT connects fixed and mobile devices by building personal area networks (PANs). Bluetooth uses frequency-hopping spread spectrum. The transmitted data are divided into packets and each packet is transmitted on one of the 79 designated BT channels. Each channel has a bandwidth of 1 MHz. A recently developed BT implementation, Bluetooth 4.0, uses 2 MHz spacing which allows for 40 channels.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

FIG. 1 illustrates an exemplary wireless charging infrastructure. In FIG. 1, conference room 100 is shown with wireless charging pads (i.e., PTUs) 100 positioned on desk 105. Each PTU 110 is designated to support one or more s PRUs. While FIG. 1 shows PRUs including laptop 120 and smart devices 130, the disclosed principles are not limited thereto and may include any device capable of wireless charging.

Figure 2:
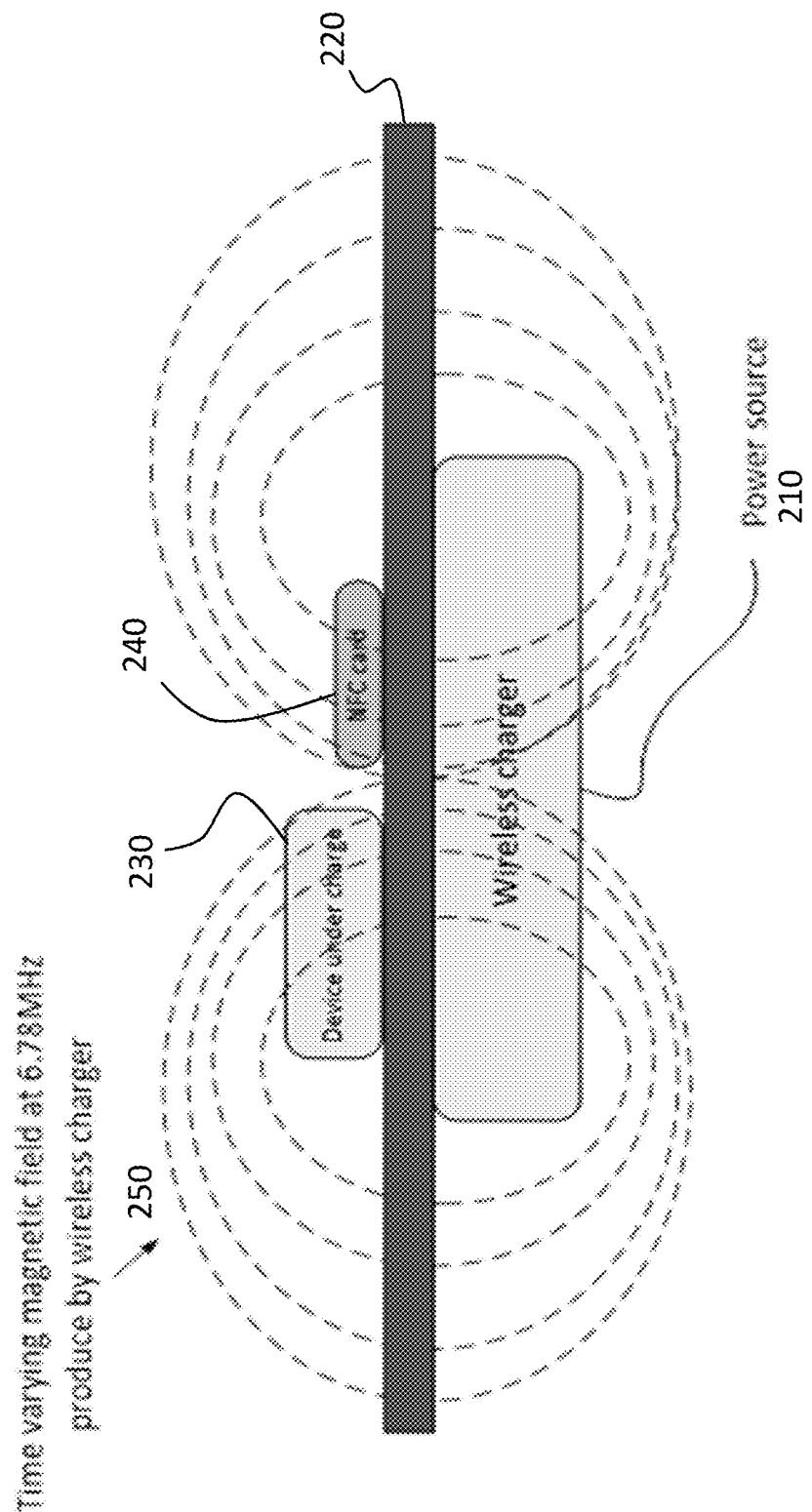
FIG. 2 is a schematic overview showing a A4WP charger and a device under charge.

FIG. 2 is a schematic overview showing a A4WP charger, a DUC and an optional NFC card. Specifically, FIG. 2 illustrates wireless charger 220 connected to power source 210 and emitting time varying magnetic field 250. The magnetic field is emitted at 6.78 MHz which is used by DUC 230 to convert it into power used to charge the device battery (not shown). An optional NFC card 240 is located on charger 220 and may be charged thereby. NFC card 240 may be damaged by magnetic field 250 which produces voltage and current in the NFC coil (not shown) due to inductive coupling.

As briefly described, RFI between the PTU and the wireless radios (e.g., LTE, 3G, GNSS, WiFi, etc.) is a challenging problem for A4WP. The RFI detracts from the user experience of wireless PTUs operating under the A4WP standard. The PTU usually employs switched-mode power amplifiers for its high power conversion efficiency when driven by an ideal square wave with sharp rising and falling edges at 6.78 MHz. The waveforms contain a wide range of harmonics in frequency domain and cause RFI that could fall into the operation bands of a wireless radio of the PRU and thereby significantly impact the radio's performance. Conventional systems provide no solution to resolve co-existence of wireless charging and the radios in a PRU in an efficient and scalable manner.

In one embodiment, the disclosure provides methods and systems for dynamically adapting the RFI to address these and other deficiencies. The conventional wireless platforms include BLE radios which are used for controlling power level, identification of valid loads and device protection. In an exemplary embodiment, the disclosure provides method and system to dynamically adapt the wireless charging system characteristics to mitigate RFI issue depending on the radio service/frequency band being used. In one embodiment, the BLE communication link and its associated radio is used to verify if the RFI from wireless charging circuits is higher than a given threshold (for example, 3 dB higher than the system noise sensed by the wireless radio) and thus needs to be mitigated.

In certain embodiments, if the RFI is higher than a desired threshold, then the slew rate of the wireless charging power amplifier driving signal waveform is slowed to lower the RFI. This has minimal impact on the charging efficiency. The method coordinates the wireless radio with RFI from wireless charging circuits for improved radio performance. Thus, instead of unknowingly sacrificing wireless charging efficiency, the wireless charging efficiency is reduced only on an as-needed basis. The disclosed embodiments, improve the overall performance of wireless charging systems. For example, a smartphone being charged by a charging pad PTU may run a GPS application with minimal RFI detraction.

Slew rate is known as the maximum rate at which an amplifier can respond to an abrupt change of input level. Conventional PTUs operate on a known slew rate. In one implementation of the disclosure, the slew rate is adaptively changed by tuning the slope of the rising and falling edge on the switching waveforms. The tuning optimizes the power spectrum of the RFI interference and the wireless charging efficiency.

TABLE 1 shows the results of simulated RFI power and charging efficiency for various experimental slew rates. The RFI power and the power amplifier efficiency of the charging system was simulated with various slew rates of the switching waveform for an exemplary PTU.

TABLE 1

Simulated RFI Power v. charging efficiency

| Slew rate of switching waveform | RFI interference power | Wireless charging efficiency |
|---|---|---|
| 5 V/6 nsec | X | 92.1% |
| 5 V/12 nsec | X-6.02 dB | 91.2% |
| 5 V/15 nsec | X-7.96 dB | 89.5% |
| 5 V/18 nsec | X-9.54 dB | 85.8% |
| 5 V/21 nsec | X-10.88 dB | 80.99% |
| 5 V/24 nsec | X-12.04 dB | 72.3% |

The simulation results of FIG. 1 illustrate that wireless charging efficiency decreases as the slew rate of switching waveform decreases. Based on the simulation results, certain embodiments provide a method of using multi-gear slew rates to optimize RFI interference and charging efficiency. The multi-gear slew rate may be 3-gear slew rate (e.g., 5 v/6 nsec, 5 v/12 nsec and 5 v/15 nsec) or 2-gear of slew rates (e.g., 5 v/6 nsec, 5 v/15 nsec). Other slew rates can be used to minimize RFI and optimize charging efficiency without departing from the disclosed principles. TABLE 1 also shows that at the lowest gear, less than 3% charging efficiency is lost and a gain of about 8 dB is made on RFI reduction.

In another experiment, the total isotropic sensitivity (TIS) of LTE and WCDMA on phone and PC were measured. A significant de-sense (radio sensitivity loss) was observed. For instance, it was observed that at LTE band17 channel #5730, the radio de-sense on phone was about 19 dB. One of the key performance indicators of wireless radio is the receiver sensitivity, which reflects the maximum working range between the device and the base station. In one embodiment, de-sense is defined as the sensitivity loss due to the interference. Larger de-sense corresponds to less working range between the device and the base station.

Figure 3:
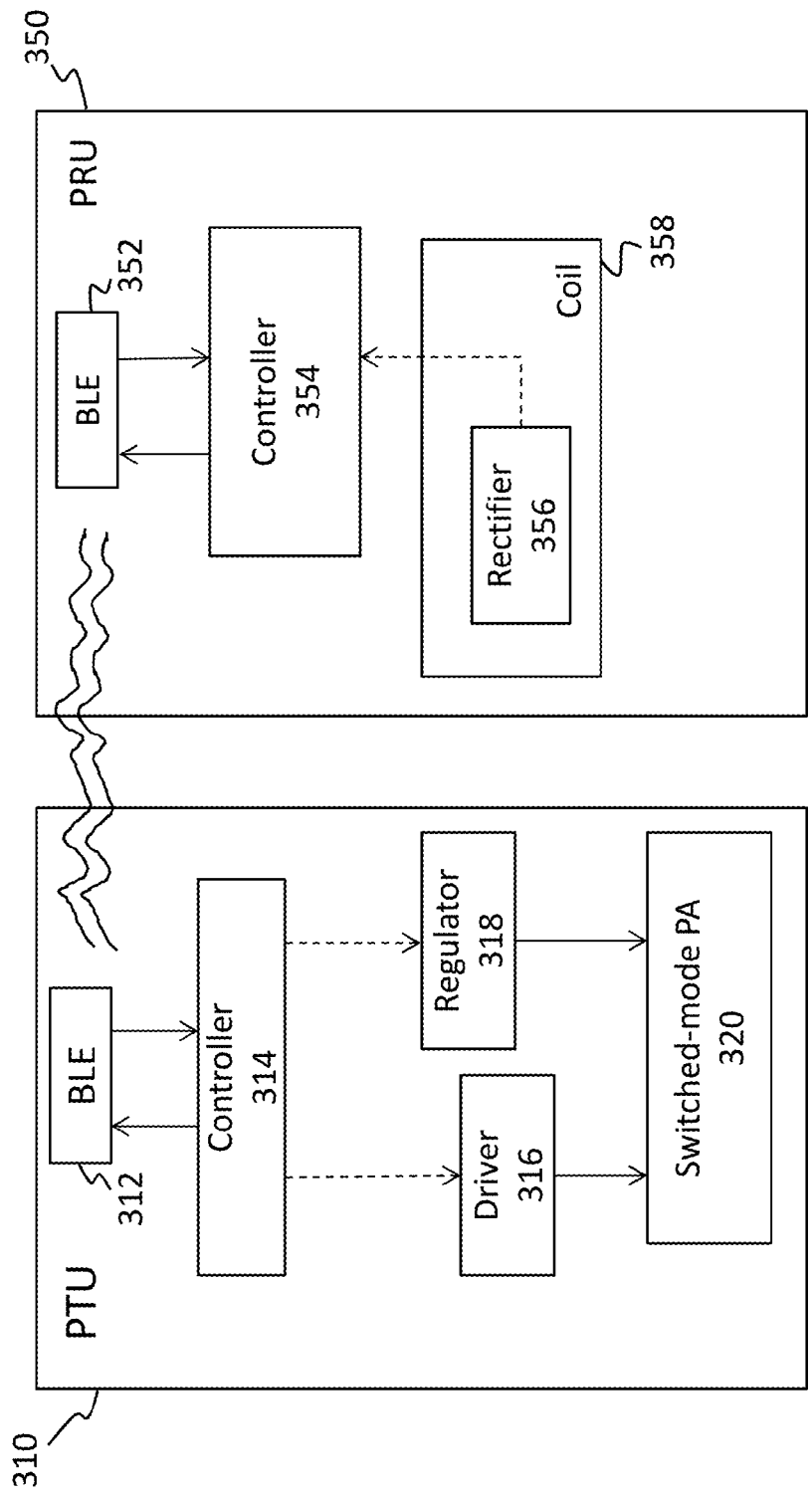
FIG. 3 is a schematic system block diagram of the wireless charging system according to one embodiment of the disclosure.

FIG. 3 is a schematic system block diagram of the wireless charging system according to one embodiment of the disclosure. FIG. 3 includes PTU 310 and PRU 350. PTU 310 may be a wireless charging pad such as those discussed in relation to FIGS. 1 and 2. PTU 310 comprises BLE communication platform 312, controller 314, driver 316, regulator 318 and switched-mode power amplifier (PA) 320. While not shown, BLE Communication platform may include antenna and RF front end to receive and convert analog signals to digital data stream. Driver 316 may comprise circuitry to generate square waveforms for the switched-mode PA 320. Regulator 318 may comprise circuitry to provide current (DC) switched-mode PA 320. Regulator 318 may comprise, for example, a battery or a charger. Switched-mode PA 320 converts DC power to AC power to charge PRU 350. Switched-mode PA 320 receives input from regulator 318 (power) and driver 316 (waveform) to produce the desired waveform to charge the PRU. The inputs to switched-mode PA 320 may be adjusted according to the disclosed embodiment to reduce RFI.

Controller 314 may comprise processor circuitry (not shown) in communication with memory circuitry (not shown) to control the slew rate for optimal RFI/charging. The processor circuitry may be actual, virtual or a combination of an actual and virtual circuitry. The processor may contain instructions to communicate with the DUC to obtain an indication of RFI level. The processor circuitry may further comprise one or more logical modules to implements various controller tasks described below. The memory circuitry may include actual or virtual memory. The memory circuitry may store instructions and data to be accessed by the processor circuitry. In an exemplary embodiment, the memory circuitry may retain RFI information indicating the interference level (e.g., signal to noise ratio) for a DUC radio at a known slew rate. Controller 314 may be integrated with the PTU. In certain embodiment, controller 314 may comprise a conventional controller that is programmed to perform controller tasks consistent with the disclosed principles.

Switched-mode PA 320 amplifies signal(s) received from driver 316 to charge PRU 350. For example, switched-mode PA 320 may receive a 0.5 W input from driver 316 and amplify it to 10-20 W to charge PRU 350 at substantially the same frequency. While not shown in FIG. 3, each of PTU 310 and PRU 350 may include antenna(s) and front-end radios for receiving and processing signals for other communication modalities including cellular and WiFi. Each antenna may correspond to a specific front-end radio.

PRU 350 may be any device configured for wireless charging. PRU 350 may be, for example, a smartphone, a tablet or a portable computer. PRU 350 comprises BLE communication platform 352, controller 354, rectifier 356 and coil 358. While not shown, BLE Communication platform 354 may include antenna and RF front-end to receive and convert analog signals to digital data stream. Controller 354 communicates with BLE 352 to provide information and measurements such as signal-to-noise ratio (SNR), temperature or other relevant information. While not shown, controller 354 may also comprise a processor circuitry and a memory circuitry ad described in relation to processor circuitry of controller 314. The process shown in FIG. 4 (which is discussed below) may be performed by controller 314 (or its components) in PRU 310. The PRU controller 354 may communicate with the communication platform (such as smartphone, tablet or computer 350) via interface (such as I2C or UART as described below) to obtain the radio information such as radio active status and instant SNR of the radio. Controller 354 may also communicate with PTU 310 via BLE radio to convey the command such as reducing the PTU power (setPwr) and slow the slew rate (slowSlewRate) for the PA driver. Similar process may also be modified and adopted in PTU controller 310. The active radio states and the SNR values may be communicated to PTU via BLE link. The decision on whether the A4WP interference level is above certain threshold can be made in the PTU controller 314. Then PTU controller 314 can send command to the PA driver for slew rate modification. In another exemplary embodiment, the decision may be made by the PRU controller 354 and communicated to PTU 310. In still another exemplary embodiment, the decision may be made by an external controller and communicated to each of controllers 314 and 354.

During normal charging operation, the output of the switched-mode PA 320 may provide an AC waveform that resonates at about 6.78 MHz. The AC waveform generated by PA 320 may be received at PRU coil 358 which converts the AC waveform back to DC in order to charge PRU 350. Rectifier 356 of PRU 350 may convert the AC waveform to charge PRU 350.

When PTU 310 detects an active radio in device under charge (i.e., PRU 350), controller 314 of PTU 310 coordinates the RFI from wireless charging circuit (i.e., switched mode PA) with the wireless signal to improve PRU's radio performance. As described above, an active radio may be detected when a communication platform associate with the system (such as smartphone) communicates radio information to PRU controller via inter-integrated circuit (I2C) or universal asynchronous receiver/transceiver (UART) interface. PRU can communicate with PTU via BLE.

BLE 312 of PTU 310 may communicate with BLE 352 of PRU 350 and request SNR and/or other measurements or interference indications. In one embodiment, temperature of the PRU may be measured and used as an indication to change slew rate. To this end, the platform may include one or more temperature sensors and associated circuitry to detect rapid temperature increase and report as needed.

Controller 314 of PTU 310 may determine whether there is a need to slow the slew rate based on the information provided by PRU 350. The decision may be based on the measurement results on the ratio of wireless charging interference power and the system noise sensed by the radio. The SNR associated with PRU 350 radio may be measured for this purpose. If controller 314 determines that RFI exceeds a given threshold, controller 314 may direct driver 316 and/or regulator 318 to reduce the slew rate or to switch to a lower gear. For example, slew rate may be switched from 5V/6 nsec to 5 v/12 nsec. The change in slew rate will cause regulator 318 to provide driving signals having a different rise and fall times. Controller 314 may then request a subsequent RFI or other measurements from PRU 350. Controller 354 of PRU 350 may measure a new SNR and communicate back to controller 314. Controller 314 may further adjust the slew rate to reduce RFI (for example, by further reducing the slew rate) or maintain the last slew rate as a function of the interference. If controller 314 determines that PRU 350 is no longer using its radio, it may return the slew rate to optimal charging levels.

In an exemplary embodiment, the controller may request and receive (1) an interference indication with wireless charging, and (2) interference indication of system background noise associated with the PRU's radio communication. The controller may then determine whether a ratio of the interference indication with wireless charging and the interference indication of system background noise exceeds a threshold. The threshold may be selected apriori according to desired interference ratio and optimal charging criteria. Controller 314 may then instruct driver 316 to affect the slew rate or adapt other conditions to strike a balance between optimal charging and radio interference.

Figure 4:
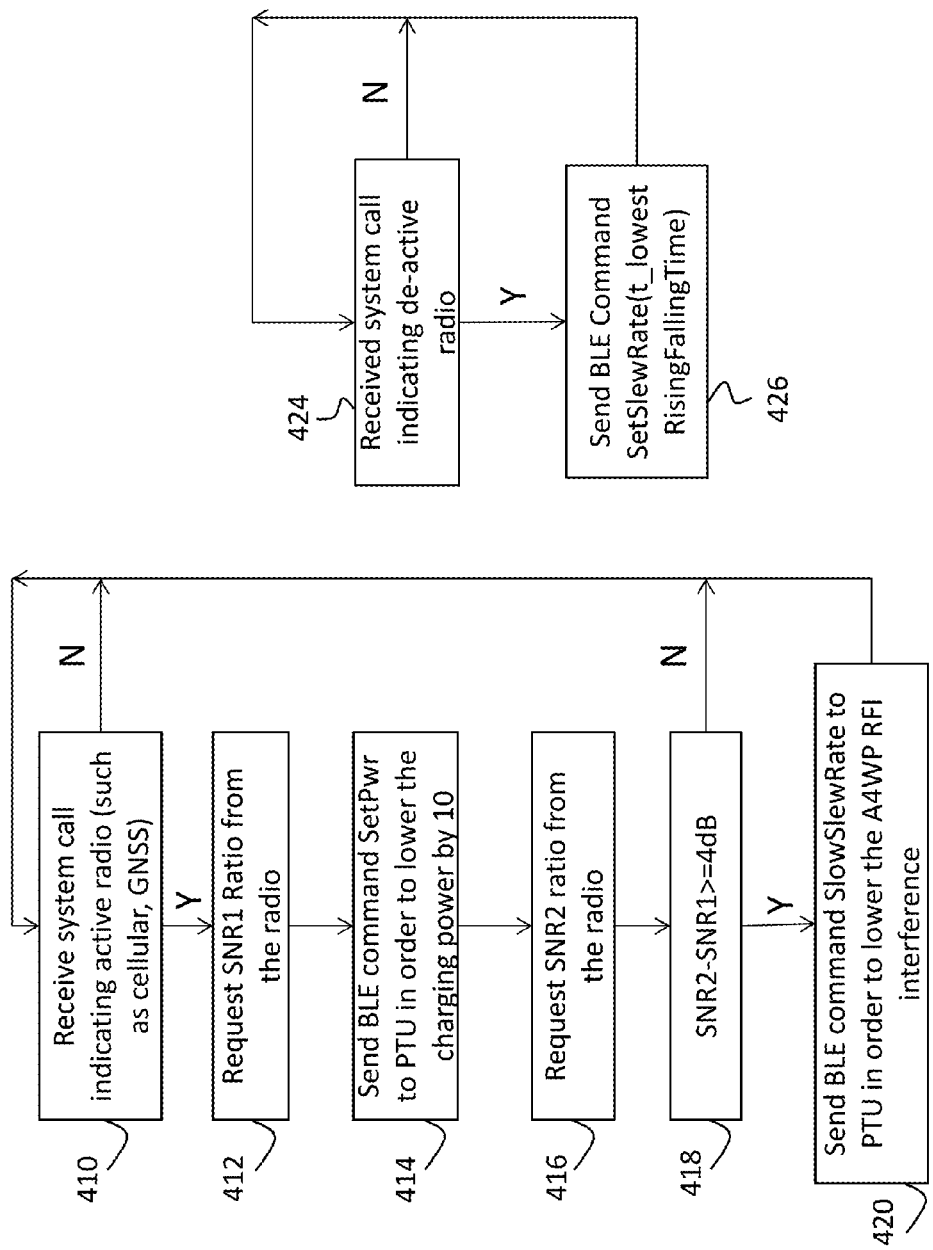
FIG. 4 shows an exemplary process flow diagram according to one embodiment of the disclosure.

FIG. 4 shows an exemplary process flow diagram according to one embodiment of the disclosure. The flow diagram of FIG. 4 may be implemented in the exemplary environment of FIGS. 1 and 3 with a PTU and a PRU. The process of FIG. 4 may be performed by the controller in a PRU. The PRU controller can also communicate with the communication system (e.g., smartphone, PC, tablet) to obtain radio information including activity status and the instant SNR. The controller can also communicate with the PTU controller through BLE messaging to convey command such as reduce PTU power (i.e., setPwr) and slow the slew rate (slowSoweRate) for the PA driver. Similar processes may also be modified and adopted in the PTU Controller. In one embodiment, the decision on whether the A4WP interference level is above certain threshold may be made in the PTU controller.

In one implementation, the system (e.g., smartphone, PC, tablet) notifies the PRU controller that the associated wireless radio platform (such as LTE) has been activated via the I2C or UART interface (e.g., step 410). A conventional UART is a microprocessor with programming that controls a platform or a system's interface to its attached or its peripheral device's serial port.

Referring again to FIG. 4, the PRU controller may request interference (e.g., SNR1) information from an associated radio (e.g., smartphone). The interference indication may be quantified as SNR or carrier-to-noise ratio (CNR) measured at the radio platform. Other interference indications may be used without departing from the disclosed principles. For simplicity, the first interference indication of FIG. 4 is identified as SNR1. The SNR1 value may then be communicated to the PRU, and optionally, to the PTU. If the interference value is higher than a predefined threshold, the PRU may send a command to lower charging power to the PTU as shown in step 414. The command may require the PTU to adjust charging power (SetPwr to lower power to P_current/10) in order to lower the A4WP RFI interference. Referring to FIG. 3, for example, controller 314 may receive such command from PRU 350 and instruct regulator 318 to lower power supplied to Switched-Mode Amplifier 320.

In step 416, the PRU controller may send a subsequent SNR request (i.e., SNR2) to the associated radio platform. The subsequent SNR request(s) may be sent after a predetermined time interval. The associated radio platform may measure the subsequent interference ratio and respond with SNR2 value to PRU (and optionally PTU). If SNR2 is higher than a predetermined threshold, additional steps may be taken to reduce interference. These steps may include one or more of: lowering the charging power by reducing PA output, reducing frequency harmonics and/or slowing the slew rate waveform.

In certain embodiments, the difference between SNR1 and SNR2 may be compared to a predetermined threshold. If the difference between the subsequent and the earlier measured SNR values is equal or greater than a threshold (e.g., $SNR_2-SNR_1 \geq 4$ dB as shown in Step 418), the PRU controller may send BLE command to PTU to request the PA driver to increase the rising/falling time to thereby slow the slew rate as shown in step 420. With reference to FIG. 3, controller 314 may instruct driver 316 to slow the slew rate by a predefined amount. The predefined amount(s) may be stored in a memory circuit (not shown) associated with controller 314. As before, other steps, including reducing frequency harmonics and/or lowering PA's charging power may also be implemented.

Equation (1) shows an exemplary calculation implemented at step 418 of FIG. 4. The calculation may be implemented at the controller (e.g., controller 312, FIG. 3) and the results may be stored at a local memory.

$$SNR_2-SNR_1=10*\log 10((N+Nc)/(N+Nc/10)) \quad (1)$$

Where N is the system background noise and Nc is the A4WP RFI interference. According to Equation (1), if Nc is twice larger than N, then $SNR_2-SNR_1 \geq 4$ dB. On the other hand, if the PRU controller receives a system call indicating a wireless radio has become inactive (step 424), then the PRU controller can send the BLE command to the PTU in order to reset the slew rate (step 426). Equation (1) may be considered as the ratio of the first and second interference. It is noted that other interference measurements may be used for interference ratio indication. Steps 424 and 426 may be implemented simultaneously and in addition to steps 410-420.

Figures 5A, 5B:
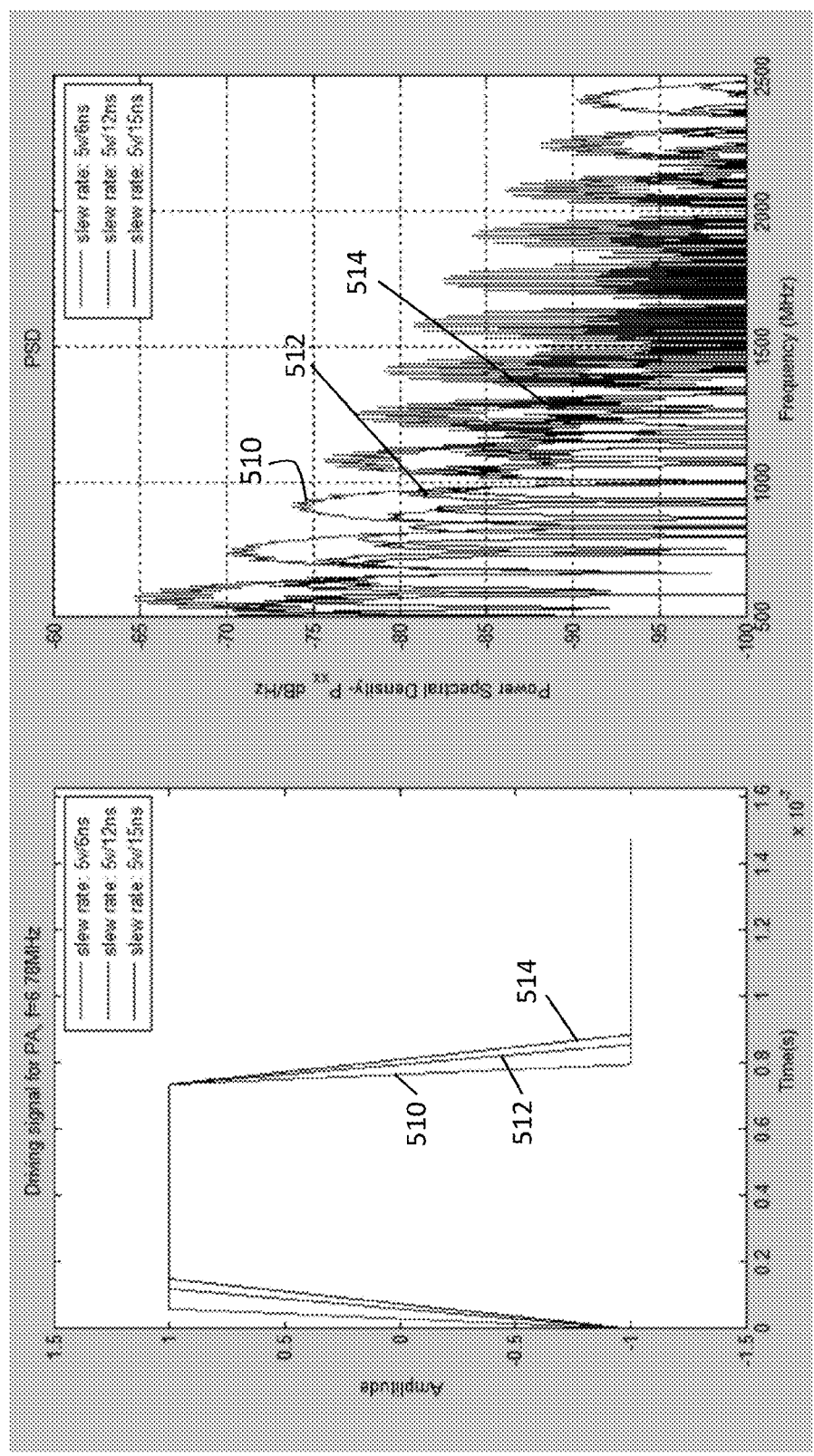
FIG. 5A illustrates shapes of different exemplary driving signals from a power amplifier.
FIG. 5B shows the relationship between frequency (X-axis) and power spectral density (dB/Hz)

FIG. 5A illustrates shapes of different exemplary driving signals from a PA. In FIG. 5A, the X-axis shows time and the Y-Axis shows the amplitude of the substantially square wave signal. The PA may be a switched-mode PA as discussed in relation to FIG. 3. As shown in FIG. 5A, the slew rate of 5 v/6 ns (shown in red) 510 has significantly sharper rise and fall times (thereby sharper edges) than that of slew rates of 5 v/12 ns (blue) 512 and 5 v/15 ns (black) 516. Thus, by controlling the slew rate at the PA, the shape of the waveform can be controlled and the potential for RFI may be decreased.

FIG. 5B shows the relationship between frequency (X-axis) and power spectral density (dB/Hz). Specifically, FIG. 5B shows the relationship for different slew rates shown in FIG. 5A. It can be seen from FIG. 5B that as the slew rate decreases from 5 v/6 ns (red harmonics) 510 to 5 v/12 ns (blue harmonics) 512 and finally to 5 v/15 ns (black harmonics) 514 the power density also decreases.

Figure 6:
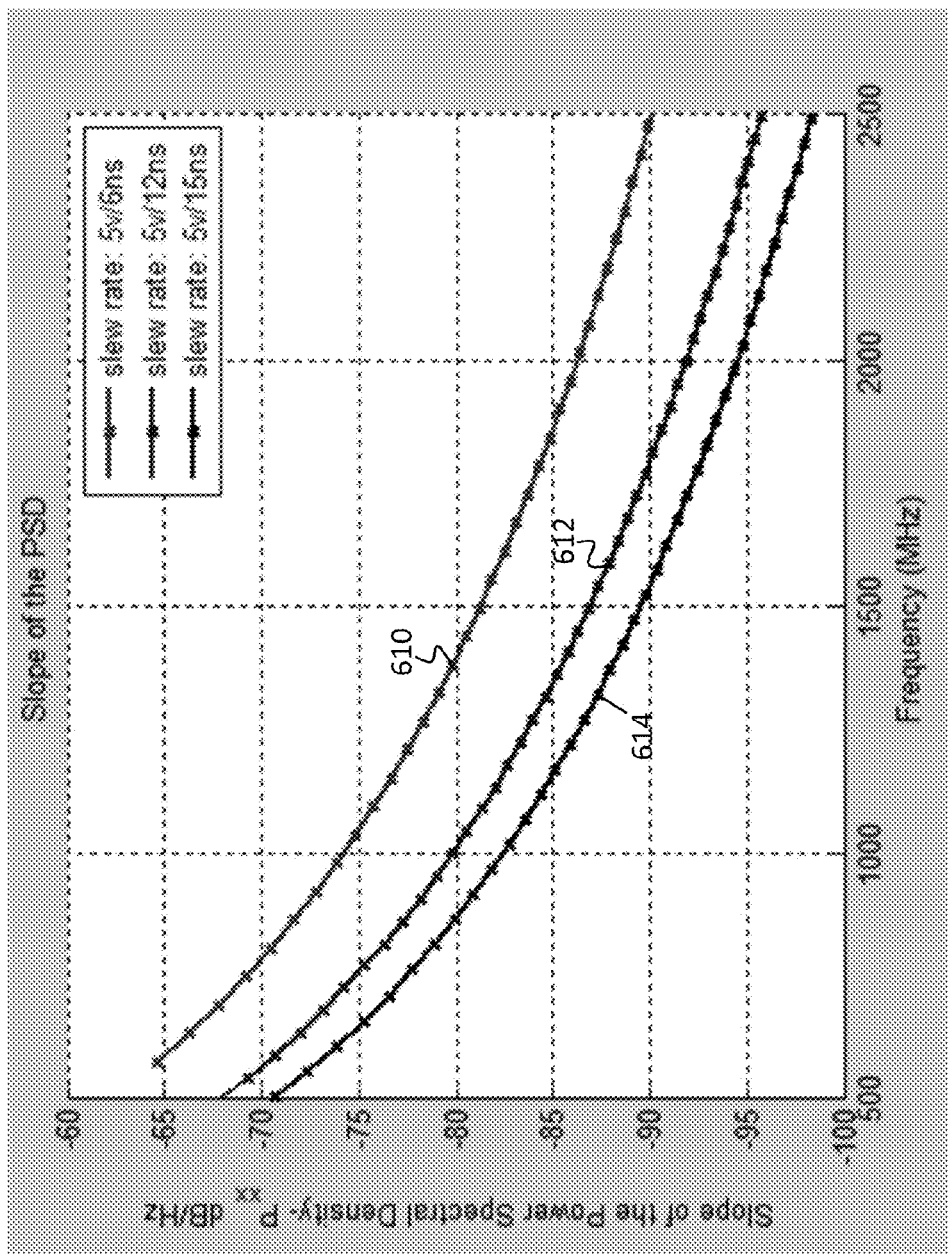
FIG. 6 shows a simulated envelop of RFI spectrum versus various slew rates.

FIG. 6 shows a simulated envelop of RFI spectrum versus various slew rates. More specifically, FIG. 6 shows the simulated envelope of the RFI spectrum with various slew rates. The roll off difference demonstrates the benefit of RFI reduction with slower slew rate of the driving signal. In FIG. 6, curve 610 is for slew rate of 5 v/6 ns; curve 612 is for the slew rate of 5 v/12 ns and curve 614 is for slew rate of 5 v/15 ns. Each of curves 610, 612 and 614 relates, respectively, to driving signals 510, 512 and 514 of FIG. 5A.

The following relates to exemplary and non-limiting embodiments of the disclosure. Example 1 is directed to a system to reduce radio frequency interference (RFI) between magnetic field generated by a wireless charger and signals of a wireless platform, the system comprising: a controller configured to determine if an RFI value exceeds a predetermined threshold, the RFI value determined as a function of interference due to wireless charger magnetic field (Nc) and interference due to the platform background noise (N); a driver in communication with the controller, the driver configured to receive instructions from the controller to change at least one of power, frequency harmonics or slew rate of the magnetic field when the RFI value exceeds the predetermined threshold.

Example 2 is directed to the system of example 1, further comprising a power amplifier in communication with the driver, wherein the driver reduces power supplied to the amplifier when a first RFI value exceeds a first threshold.

Example 3 is directed to the system of example 2, wherein the driver reduces a slew rate of a driving signal supplied to the power amplifier when a second RFI value exceeds a second threshold.

Example 4 is directed to the system of example 3, wherein the driver reduces a slew rate of the power amplifier signal when the difference between the second RFI value and the first RFI value is greater than third threshold.

Example 5 is directed to the system of example 1, further comprising a Bluetooth Low Energy (BLE) radio in communication with the controller.

Example 6 is directed to the system of example 1, wherein the controller is further configured to determine if the RFI exceeds a predetermined threshold as a function of an operating temperature of the wireless platform.

Example 7 is directed to the system of example 1, wherein the driver is further configured to increase the slew rate to provide optimal charging when RFI is not detected.

Example 8 is directed to the system of example 1, wherein the controller is configured to determine if the RFI exceeds the predetermined threshold iteratively by comparing a plurality of consecutive interference values.

Example 9 is directed to a wireless communication device, comprising: at least one communication platform for transmitting a communication signal; a controller in communication with the communication platform, the controller configured to: receive indication of radio frequency interference (RFI) between with the communication signal and a wireless charge driving signal determine whether the RFI exceeds a predetermined threshold; if RFI exceeds the predetermined threshold, direct the communication platform to request change in at least one of power, frequency harmonics or slew rate of the magnetic field generated by a wireless charging station.

Example 10 is directed to the wireless communication device of example 9, wherein the communication platform comprises Bluetooth Low Energy (BLE) and wherein the controller directs the communication platform to communicate with an external wireless charging device with BLE packets.

Example 11 is directed to the wireless communication device of example 10, wherein the controller is further configured to determine RFI as a function of interference due to wireless charging station magnetic field (Nc) and interference due to the platform background noise (N).

Example 12 is directed to the wireless communication device of example 9, wherein the controller instructs the communication platform to request reduction of power supplied by the wireless charging station.

Example 13 is directed to the wireless communication device of example 12, wherein the controller instructs the communication platform to request reduction of a slew rate of the wireless charging station.

Example 14 is directed to the wireless communication device of example 9, wherein the controller is further configured to determine if the RFI exceeds a predetermined threshold as a function of the wireless communication device temperature.

Example 15 is directed to the wireless communication device of example 9, wherein the controller determines if the RFI exceeds the predetermined threshold iteratively by comparing a plurality of consecutive interference values.

Example 16 is directed to the wireless communication device of example 8, wherein the RFI indication is determined as one more of signal-to-noise ratio (SNR) or carrier-to-noise ratio (CNR) at the wireless communication platform.

Example 17 is directed to a method for adaptive wireless charging, the method comprising: detecting simultaneous radio communication and magnetic charging of a wireless communication device, the magnetic charging of the wireless communication device driven by a magnetic charging signal; measuring a first Radio Frequency Interference (RFI) value between the radio communication and the magnetic charging; determining whether the first RFI value exceeds a predetermined threshold; if exceeding the predetermined threshold, changing at least one of power, frequency harmonics or slew rate of the magnetic charging signal.

Example 18 is directed to the method of example 17, wherein changing at least one of power, frequency harmonics or slew rate of the magnetic charging signal further comprises communicating a Bluetooth Low Energy (BLE) message.

Example 19 is directed to the method of example 17, further comprising determining the RFI value as a function of interference due to wireless charger magnetic field (Nc) and interference due to the platform background noise (N).

Example 20 is directed to the method of example 19, further comprising measuring a second RFI value and determining whether a ratio of the first RFI value and the second RFI value exceeds a predetermined threshold.

Example 21 is directed to the method of example 17, further comprising determining whether the first interference indication exceeds a predetermined threshold as a function of the wireless communication device operating temperature.

Example 22 is directed to the method of example 17, further comprising increasing the slew rate when RFI is not detected.

Example 23 is directed to the method of example 17, wherein determining whether the first RFI value exceeds a predetermined threshold further comprises comparing successive RFI values.

Example 24 is directed to the method of example 17, wherein the first RFI value is determined as one more of signal-to-noise ratio (SNR) or carrier-to-noise ratio (CNR) at the communication platform.

Example 25 is directed to a computer-readable non-transitory storage medium that contains instructions, which when executed by one or more processors result in performing operations comprising: detecting simultaneous radio communication and magnetic charging of a wireless communication device, the magnetic charging of the wireless communication device driven by a magnetic charging signal; measuring a first Radio Frequency Interference (RFI) value between the radio communication and the magnetic charging; determining whether the first RFI value exceeds a predetermined threshold; if exceeding the predetermined threshold, changing at least one of power, frequency harmonics or slew rate of the magnetic charging signal.

Example 26 is directed to the medium of any of the preceding examples, wherein changing at least one of power, frequency harmonics or slew rate of the magnetic charging signal further comprises communicating a Bluetooth Low Energy (BLE) message.

Example 27 is directed to the medium of any of the preceding examples, further comprising determining the RFI value as a function of interference due to wireless charger magnetic field (Nc) and interference due to the platform background noise (N).

Example 28 is directed to the medium of any of the preceding examples, further comprising measuring a second RFI value and determining whether a ratio of the first RFI value and the second RFI value exceeds a predetermined threshold.

Example 29 is directed to the medium of any of the preceding examples, further comprising determining whether the first interference indication exceeds a predetermined threshold as a function of the wireless communication device operating temperature.

Example 30 is directed is directed to the medium of any of the preceding examples, further comprising increasing the slew rate when RFI is not detected.

Example 31 is directed to the medium of any of the preceding examples, wherein determining whether the first RFI value exceeds a predetermined threshold further comprises comparing successive RFI values.

Example 32 is directed to the medium of any of the preceding examples, wherein the first RFI value is determined as one more of signal-to-noise ratio (SNR) or carrier-to-noise ratio (CNR) at the communication platform.

While the principles of the disclosure have been illustrated in relation to the exemplary embodiments shown herein, the principles of the disclosure are not limited thereto and include any modification, variation or permutation thereof.

What is claimed is:

1. A system to reduce radio frequency interference (RFI) between magnetic field generated by a wireless charger and signals of a wireless platform, the system comprising:
   a controller configured to determine if an RFI value exceeds a predetermined threshold, the RFI value determined as a function of interference due to wireless charger magnetic field (Nc) and interference due to the platform background noise (N);
   a driver in communication with the controller, the driver configured to receive instructions from the controller to change at least one of power, frequency harmonics or slew rate of the magnetic field when the RFI value exceeds the predetermined threshold.

2. The system of claim 1, further comprising a power amplifier in communication with the driver, wherein the driver reduces power supplied to the amplifier when a first RFI value exceeds a first threshold.

3. The system of claim 2, wherein the driver reduces a slew rate of a driving signal supplied to the power amplifier when a second RFI value exceeds a second threshold.

4. The system of claim 3, wherein the driver reduces a slew rate of the power amplifier signal when the difference between the second RFI value and the first RFI value is greater than third threshold.

5. The system of claim 1, further comprising a Bluetooth Low Energy (BLE) radio in communication with the controller.

6. The system of claim 1, wherein the controller is further configured to determine if the RFI exceeds a predetermined threshold as a function of an operating temperature of the wireless platform.

7. The system of claim 1, wherein the driver is further configured to increase the slew rate to provide optimal charging when RFI is not detected.

8. The system of claim 1, wherein the controller is configured to determine if the RFI exceeds the predetermined threshold iteratively by comparing a plurality of consecutive interference values.

9. A wireless communication device, comprising: at least one communication platform for transmitting a communication signal; a controller in communication with the communication platform, the controller configured to: receive indication of radio frequency interference (RF) between the communication signal and a wireless charge driving signal; determine whether the RFI exceeds a predetermined threshold; if RFI exceeds the predetermined threshold, direct the communication platform to request change in at least one of power, frequency harmonics or slew rate of the magnetic field generated by a wireless charging station.

10. The wireless communication device of claim 9, wherein the communication platform comprises Bluetooth Low Energy (BLE) and wherein the controller directs the communication platform to communicate with an external wireless charging device with BLE packets.

11. The wireless communication device of claim 10, wherein the controller is further configured to determine RFI as a function of interference due to wireless charging station magnetic field (Nc) and interference due to the platform background noise (N).

12. The wireless communication device of claim 9, wherein the controller instructs the communication platform to request reduction of power supplied by the wireless charging station.

13. The wireless communication device of claim 12, wherein the controller instructs the communication platform to request reduction of a slew rate of the wireless charging station.

14. The wireless communication device of claim 9, wherein the controller is further configured to determine if the RFI exceeds a predetermined threshold as a function of the wireless communication device temperature.

15. The wireless communication device of claim 9, wherein the controller determines if the RFI exceeds the predetermined threshold iteratively by comparing a plurality of consecutive interference values.

16. The wireless communication device of claim 9, wherein the RFI indication is determined as one or more of signal-to-noise ratio (SNR) or carrier-to-noise ratio (CNR) at the wireless communication platform.

17. A method for adaptive wireless charging, the method comprising:
   detecting simultaneous radio communication and magnetic charging of a wireless communication device, the magnetic charging of the wireless communication device driven by a magnetic charging signal;
   measuring a first Radio Frequency Interference (RFI) value between the radio communication and the magnetic charging;
   determining whether the first RFI value exceeds a predetermined threshold;
   if exceeding the predetermined threshold, changing at least one of power, frequency harmonics or slew rate of the magnetic charging signal.

18. The method of claim 17, wherein changing at least one of power, frequency harmonics or slew rate of the magnetic charging signal further comprises communicating a Bluetooth Low Energy (BLE) message.

19. The method of claim 17, further comprising determining the RFI value as a function of interference due to wireless charger magnetic field (Nc) and interference due to the platform background noise (N).

20. The method of claim 19, further comprising measuring a second RFI value and determining whether a ratio of the first RFI value and the second RFI value exceeds a predetermined threshold.

21. The method of claim 17, further comprising determining whether the first interference indication exceeds a predetermined threshold as a function of the wireless communication device operating temperature.

22. The method of claim 17, further comprising increasing the slew rate when RFI is not detected.

23. The method of claim 17, wherein determining whether the first RFI value exceeds a predetermined threshold further comprises comparing successive RFI values.

24. The method of claim 17, wherein the first RFI value is determined as one more of signal-to-noise ratio (SNR) or carrier-to-noise ratio (CNR) at the communication platform.

25. A computer-readable non-transitory storage medium that contains instructions, which when executed by one or more processors result in performing operations comprising:
    detecting simultaneous radio communication and magnetic charging of a wireless communication device, the magnetic charging of the wireless communication device driven by a magnetic charging signal;
    measuring a first Radio Frequency Interference (RFI) value between the radio communication and the magnetic charging;
    determining whether the first RFI value exceeds a predetermined threshold;
    if exceeding the predetermined threshold, changing at least one of power, frequency harmonics or slew rate of the magnetic charging signal.

26. The medium of claim 25, wherein changing at least one of power, frequency harmonics or slew rate of the magnetic charging signal further comprises communicating a Bluetooth Low Energy (BLE) message.

27. The medium of claim 25, further comprising determining the RFI value as a function of interference due to wireless charger magnetic field (Nc) and interference due to the platform background noise (N).

28. The medium of claim 27, further comprising measuring a second RFI value and determining whether a ratio of the first RFI value and the second RFI value exceeds a predetermined threshold.

29. The medium of claim 25, further comprising determining whether the first interference indication exceeds a predetermined threshold as a function of the wireless communication device operating temperature.

30. The medium of claim 25, further comprising increasing the slew rate when RFI is not detected.

31. The medium of claim 25, wherein determining whether the first RFI value exceeds a predetermined threshold further comprises comparing successive RFI values.

32. The medium of claim 25, wherein the first RFI value is determined as one more of signal-to-noise ratio (SNR) or carrier-to-noise ratio (CNR) at the communication platform.

* * * * *

UNITED STATES PATENT AND TRADEMARK OFFICE
CERTIFICATE OF CORRECTION

PATENT NO. : 9,806,557 B2  
APPLICATION NO. : 14/865343  
DATED : October 31, 2017  
INVENTOR(S) : Gao et al.

Page 1 of 1

It is certified that error appears in the above-identified patent and that said Letters Patent is hereby corrected as shown below:

In the Claims

Column 12, in Claim 9, in Line 17 delete "(RF)" and replace with -- (RFI) --

Signed and Sealed this  
Twenty-seventh Day of February, 2018

Andrei Iancu  
*Director of the United States Patent and Trademark Office*